(12) United States Patent
Miyoshi et al.

(10) Patent No.: US 8,694,671 B2
(45) Date of Patent: Apr. 8, 2014

(54) ISOCHRONOUS TRANSMISSION OF AUDIO DATA USING MUTE DATA

(75) Inventors: Ryuta Miyoshi, Tokyo (JP); Yuji Ogihara, Chiba (JP)

(73) Assignee: Sony Corporation (JP)

( * ) Notice: Subject to any disclaimer, the term of this patent is extended or adjusted under 35 U.S.C. 154(b) by 1400 days.

(21) Appl. No.: 11/894,336

(22) Filed: Aug. 21, 2007

(65) Prior Publication Data

US 2008/0010383 A1 Jan. 10, 2008

Related U.S. Application Data

(62) Division of application No. 10/311,921, filed as application No. PCT/JP02/04177 on Apr. 25, 2002, now abandoned.

(30) Foreign Application Priority Data

Apr. 25, 2001 (JP) .............................. P2001-128040

(51) Int. Cl.
*G06F 3/00* (2006.01)
*G06F 15/16* (2006.01)
*G11B 5/09* (2006.01)
*H04B 1/20* (2006.01)
*H04L 25/00* (2006.01)

(52) U.S. Cl.
USPC .................. 709/232; 360/48; 369/2; 375/217; 710/5

(58) Field of Classification Search
USPC ......... 709/231, 232; 360/48; 369/2; 375/217; 710/5
See application file for complete search history.

(56) References Cited

U.S. PATENT DOCUMENTS

| 4,312,070 | A | * | 1/1982 | Coombes et al. | 714/762 |
| 4,864,573 | A | * | 9/1989 | Horsten | 714/704 |
| 5,151,922 | A | * | 9/1992 | Weiss | 375/217 |
| 5,271,011 | A | * | 12/1993 | McMullan et al. | 714/807 |
| 5,802,017 | A | * | 9/1998 | Sato et al. | 369/2 |
| 5,812,734 | A | * | 9/1998 | Shimoda et al. | 386/239 |
| 5,892,848 | A | * | 4/1999 | Nishiwaki et al. | 382/232 |
| 5,905,845 | A | * | 5/1999 | Okada et al. | 386/98 |
| 6,292,846 | B1 | * | 9/2001 | Hara et al. | 710/5 |
| 6,385,212 | B1 | * | 5/2002 | Baba et al. | 370/506 |
| 6,529,969 | B1 | * | 3/2003 | Inoue | 710/33 |

(Continued)

FOREIGN PATENT DOCUMENTS

WO    WO-9941744    8/1999

*Primary Examiner* — Tonia L Dollinger
*Assistant Examiner* — Daniel C Murray
(74) *Attorney, Agent, or Firm* — Lerner, David, Littenberg, Krumholz & Mentlik, LLP

(57) ABSTRACT

In transmitting stream data to a recording unit through a network, there is a method to detect that a synchronous recording has been designated from an input unit to transmit mute data to a recording unit through the network for a first predetermined time period during which the streaming data is held in a data holding unit for the first predetermined time value. In the case where it is determined that the data that the data holding unit holds is held for a second predetermined time value, the inputted stream data is transmitted to the recording unit through the network. The recording unit is permitted to record, in the state where sound is not interrupted, and it is permitted to execute data recording, in which operating time of mechanical parts is required so that the operating state of the recording unit shifts to the recording state, and/or responses relating to the control of the recording unit are taken into consideration.

5 Claims, 10 Drawing Sheets

(56) References Cited

U.S. PATENT DOCUMENTS

| | | |
|---|---|---|
| 6,584,443 B1 * | 6/2003 | Kawamura et al. ........... 704/500 |
| 6,763,275 B2 | 7/2004 | Naruki et al. |
| 6,775,462 B1 | 8/2004 | Wang et al. |
| 6,842,579 B1 | 1/2005 | Jang et al. |
| 6,859,846 B2 * | 2/2005 | Swidler et al. .................... 710/8 |
| 6,993,646 B2 | 1/2006 | Smyers |
| 7,023,488 B2 | 4/2006 | Szybiak et al. |
| 7,023,636 B2 * | 4/2006 | Oota ................................ 360/48 |
| 7,069,224 B2 * | 6/2006 | Kawamura et al. ........... 704/500 |
| 7,397,920 B2 * | 7/2008 | Hamada ........................ 380/237 |
| 7,408,954 B2 * | 8/2008 | Takaku ......................... 370/466 |
| 7,760,662 B2 * | 7/2010 | Maeda .......................... 370/252 |
| 7,773,107 B2 * | 8/2010 | Kwon et al. ................. 348/14.03 |
| 7,801,410 B2 * | 9/2010 | Koyama ................. 369/47.18 |
| 7,817,584 B2 * | 10/2010 | Campbell et al. ............. 370/261 |
| 7,929,447 B2 * | 4/2011 | Bardini et al. ................. 370/236 |
| 8,391,683 B2 * | 3/2013 | Kikuchi et al. ............... 386/334 |
| 8,391,684 B2 * | 3/2013 | Kikuchi et al. ............... 386/334 |
| 8,391,685 B2 * | 3/2013 | Kikuchi et al. ............... 386/334 |
| 2003/0171935 A1 * | 9/2003 | Kawamura et al. ........... 704/500 |
| 2003/0179745 A1 * | 9/2003 | Tsutsumi et al. ............. 370/352 |
| 2005/0169114 A1 * | 8/2005 | Ahn .................................. 369/7 |
| 2006/0165385 A1 | 7/2006 | Aoki |
| 2007/0093221 A1 * | 4/2007 | Kato ........................ 455/194.1 |
| 2007/0200918 A1 * | 8/2007 | Kwon et al. ................. 348/14.03 |
| 2010/0238947 A1 * | 9/2010 | Maeda ......................... 370/412 |

* cited by examiner

| 71 | 72 | 73 | 74 | 75 | 76 | 77 | 78 |
|---|---|---|---|---|---|---|---|
| ONLINE | BROADCAST CONNECTION COUNTER | POINT-TO-POINT CONNECTION COUNTER | RESERVED | CHANNEL NUMBER | DATA RATE | OVERHEAD ID | PAYLOAD |
| 1 | 1 | 6 | 2 | 6 | 2 | 4 | 10 |

FIG.7

| OVERHEAD ID ⟋81 | IEEE1394 BAND WIDE ALLOCATION UNIT ⟋82 | OVERHEAD ID ⟋83 | IEEE1394 BAND WIDE ALLOCATION UNIT ⟋84 |
|---|---|---|---|
| 0000h | 512 | 1000h | 256 |
| 0001h | 32 | 1001h | 288 |
| 0010h | 64 | 1010h | 320 |
| 0011h | 96 | 1011h | 352 |
| 0100h | 128 | 1100h | 384 |
| 0101h | 160 | 1101h | 416 |
| 0110h | 192 | 1110h | 448 |
| 0111h | 224 | 1111h | 480 |

FIG.8

| 91 | 92 | 93 | 94 | 95 | 96 | 97 | 98 |
|---|---|---|---|---|---|---|---|
| ZERO | PREAMBLE | PARITY | CHANNEL | USER | VALIDATE | Aux | SAMPLE |
| 00 | 01 | 0 | 0 | 0 | 0 | 0000 | 0000 0000 0000 1111 1111 |

| BYTE | RAW PACKET |
|---|---|
| 0 | 00307EA0 |
| 4 | F1611197 |
| 8 | 020200CA |
| 12 | 9001FFFF |
| 16 | 100000FF |
| 20 | 000000FF |
| 24 | 100000FF |
| 28 | 000000FF |
| 32 | 100000FF |
| 36 | 000000FF |
| 40 | 100000FF |
| 44 | 000000FF |
| 48 | 100000FF |
| 52 | 000000FF |
| 56 | CCB00CBF |

FIG.10B

| LENGTH | tag | CHANNEL | t Code | sy |
|---|---|---|---|---|
| 0000000000110000 | 01 | 111110 | 1010 | 0000 |
| HEADER CRC | | | | |
| 1111 0001 0110 0001 0001 0001 1001 0111 | | | | |

| Sync0 | SID | DBS | FN | QPO | SPH | Reserved | DBC |
|---|---|---|---|---|---|---|---|
| 00 | 000010 | 00000010 | 00 | 000 | 0 | 00 | 11001010 |

| Sync1 | FMT | FDF | SYT1 | SYT2 |
|---|---|---|---|---|
| 10 | 010000 | 00000001 | 11111111 | 11111111 |

| Data(Sample1) |
|---|
| 0001 0000 0000 0000 0000 0000 1111 1111 |
| Data(Sample1) |
| 0000 0000 0000 0000 0000 0000 1111 1111 |
| Data(Sample2) |
| 0001 0000 0000 0000 0000 0000 1111 1111 |
| Data(Sample2) |
| 0000 0000 0000 0000 0000 0000 1111 1111 |
| Data(Sample3) |
| 0001 0000 0000 0000 0000 0000 1111 1111 |
| Data(Sample3) |
| 0000 0000 0000 0000 0000 0000 1111 1111 |
| Data(Sample4) |
| 0001 0000 0000 0000 0000 0000 1111 1111 |
| Data(Sample4) |
| 0000 0000 0000 0000 0000 0000 1111 1111 |
| Data(Sample5) |
| 0001 0000 0000 0000 0000 0000 1111 1111 |
| Data(Sample5) |
| 0000 0000 0000 0000 0000 0000 1111 1111 |
| Data CRC |
| 1100 1100 1011 0000 0000 1100 1011 1111 |

ISOCHRONOUS TRANSMISSION OF AUDIO DATA USING MUTE DATA

CROSS-REFERENCED TO RELATED APPLICATIONS

This application is a divisional of U.S. application Ser. No. 10/311,921, filed on May 23, 2003, the disclosure of which is incorporated herein by reference.

TECHNICAL FIELD

The present invention relates to a data transmitting method and a data transmitting apparatus for transmitting stream data, and more particularly to a method and an apparatus for transmitting stream data from personal computer to 1394 audio recording apparatus to record such stream data with respect to recording medium.

BACKGROUND ART

IEEE 1394 audio apparatus adapted for carrying out communication of audio data through network by communication interface in conformity with the so-called IEEE standard is known. The IEEE 1394 audio apparatus has a function such that in the case where the content of received data is extraordinary, or in the case where data which is not audio data is received, mute is reproduced by making use of mute function, or received data is neglected.

On the other hand, a method of recognizing personal computer (PC) as IEEE 1394 audio apparatus by driver software has been devised. In this case, when driver software transmits audio data to a recording apparatus provided with IEEE 1394 communication interface immediately after reproduction start request from the application software side of the personal computer, there are instances where missing data portion may take place in recording data at the recording apparatus. For example, in the case where the recording apparatus is IEEE 1394 mini disc (trade mark) recording/reproducing apparatus, it took much time until the results the state of mute OFF for allowing the IEEE 1394 mini disc recording/reproducing apparatus to record received valid audio data from the state of mute ON for allowing such mini disc recording/reproducing apparatus not to record invalid received data, resulting in the fact that data corresponding to this transition time is missing in recorded audio data.

Namely, in isochronous data transfer in the above-described IEEE 1394 standard, in order to allow operating state of the IEEE 1394 mini disc recording/reproducing apparatus to shift to recordable state, it is necessary to maintain link between the personal computer and the mini disc recording/reproducing apparatus, and it is required to send recordable data from the personal computer side to the IEEE 1394 mini disc recording/reproducing apparatus. For this reason, when the IEEE 1394 mini disc recording/reproducing apparatus is operated from on the personal computer to automatically record audio data, since there exists processing such as response relating to control from the personal computer with respect to mechanical parts for shift to recording state or the IEEE 1394 mini disc recording/reproducing apparatus, there was the inconvenience that the portion of audio data from the time when reception of actual data desired to be recorded is started until transition (shift) to recordable state fails to be recorded.

DISCLOSURE OF THE INVENTION

The present invention has been made in view of the above-described actual circumstances, and an object of the present invention is to provide a data transmitting method and a data transmitting apparatus adapted for transmitting stream data so as to have ability to precisely record stream data such as audio data, etc. by a recording apparatus.

To attain the above-described object, a data transmitting apparatus according to the present invention is directed to a data transmitting apparatus for transmitting stream data successively reproduced at a point of time to a recording unit connected through the network, the data transmitting apparatus comprising: communicating means connected to the network and serving to carry out communication with the recording unit; data holding means adapted so that content of held data can be changed from the recording unit through the network; input means adapted so that stream data is inputted; operation input means adapted so that an operation of designation for recording the stream data with respect to the recording unit in synchronism with reproduction of the stream data is inputted; mute data generating means for generating data having the same signal form as that of the stream data and indicating mute; and control means for carrying out a control such that in the case where synchronous recording is designated from the operation input means, it transmits data indicating the mute data generating means generates to the recording unit through the network for a first predetermined time period during which data is held in the data holding means and in the case where data that the data holding means holds is held for a second predetermined time, it transmits the stream data inputted from the input means to the recording unit through the network.

In addition, a data transmitting method according to the present invention is directed to a data transmitting method of transmitting stream data successively reproduced at a point of time to a recording unit connected to network through the network, the data transmitting method including: a step of detecting that synchronous recording is designated from input means; a step of transmitting mute data generated from mute data generating means to the recording unit through the network for a first predetermined time period during which data is held in the data holding means; and a step of transmitting inputted stream data to the recording unit through the network in the case where it is detected that data that the data holding means holds has been held for a second predetermined time.

BRIEF DESCRIPTION OF THE DRAWINGS

FIG. 7 is a view showing register oPCR (ffff F000 0904h.about.ffff f000 097Ch) indicating Online state, Offline state, transfer enable state and transfer disable state.

FIG. 8 is a view showing overhead ID.

FIG. 9 is a view showing the detail of data portion of instruction which changes input source sent from personal computer to audio recording/reproducing apparatus.

FIG. 10 is a view showing packet example (Isochronous Transaction) in which mute data is outputted to IEEE 1394 MD device, wherein FIG. 10A shows packet and FIG. 10B shows packet content.

BEST MODE FOR CARRYING OUT THE INVENTION

In the data transmitting method and the data transmitting apparatus according to the present invention, when, e.g., personal computer connected to IEEE 1394 network prescribed by the IEEE standard is assumed to be virtual IEEE audio output apparatus, audio data is transmitted from the personal computer to an IEEE 1394 audio recording unit connected to the IEEE 1394 network to allow that recording unit to record audio data. It is to be noted that, in order that the operating state of the IEEE 1394 audio recording unit shifts to recording state as described above, operating time of the mechanical parts and/or other internal processing time are required. In view of the above, in the data transmitting apparatus and the data transmitting method according to the present invention, there is employed such an approach to permit execution of data recording in which response relating to control from personal computer with respect to IEEE 1394 audio recording unit, etc. is taken into consideration.

Figure 1:
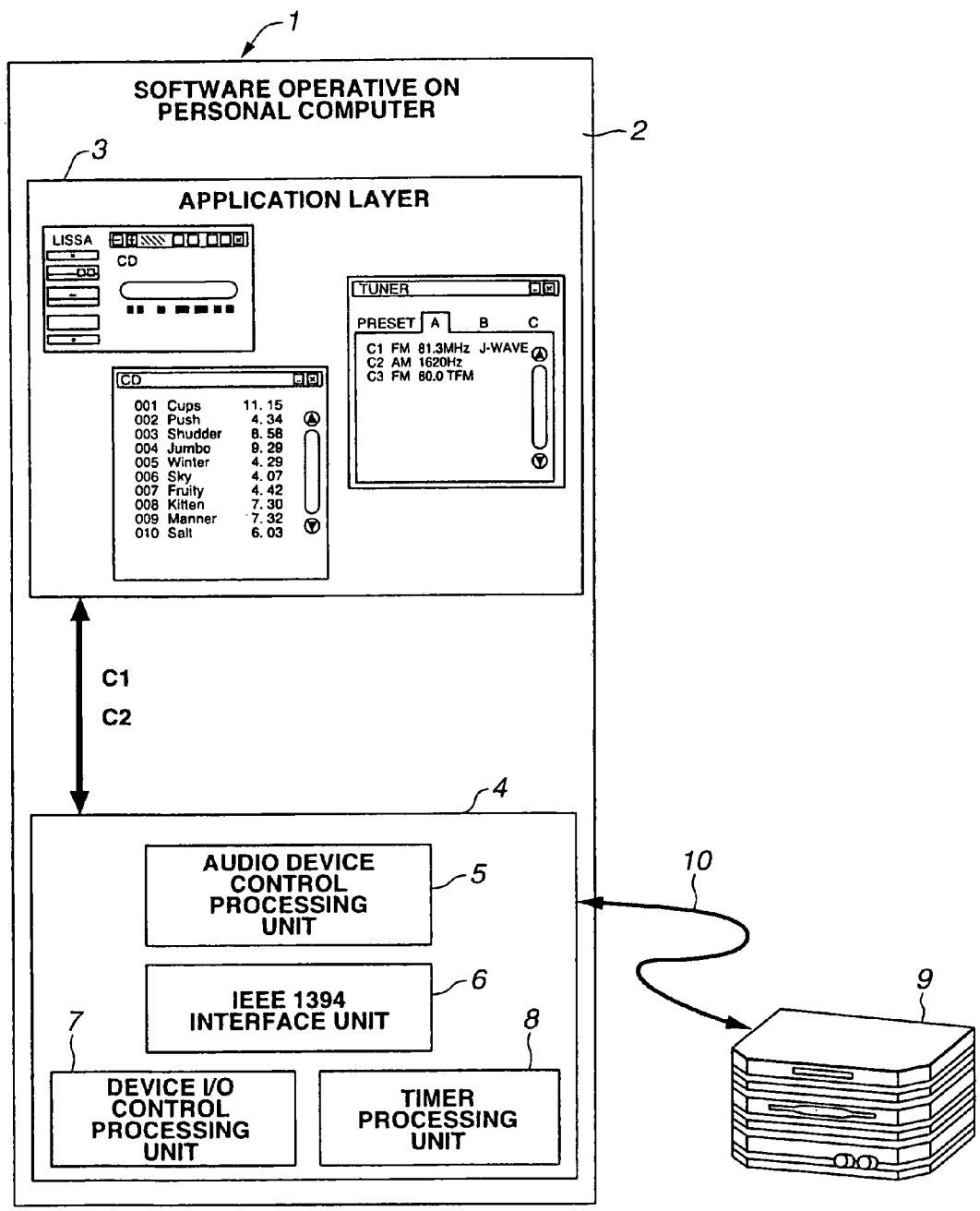
FIG. 1 is a block diagram showing the configuration of a data transmission system to which the present invention is applied.

FIG. 1 is a block diagram showing the configuration of a data transmission system to which the present invention is applied. This data transmission system comprises, as shown in FIG. 1, a personal computer 1 for carrying out control of data transmission system, an audio unit 9 for reproducing audio data, and an IEEE 1394 network 10 for carrying out communication in conformity with the IEEE 1394 standard.

The personal computer 1 includes, as shown in FIG. 1, an application layer 3 and a device driver layer 4 as software 2 operative on the personal computer 1. The application layer 3 and the device driver layer 4 carry out transmission/reception of the so-called audio device control C1 or device I/O control C2 to thereby carry out control of the personal computer 1 and the audio unit 9 connected through the IEEE 1394 network 10.

The device driver layer 4 includes, as shown in FIG. 1, an audio device control processing unit 5, an IEEE 1394 interface unit 6, a device I/O control processing unit 7, and a timer processing unit 8.

Figure 2:
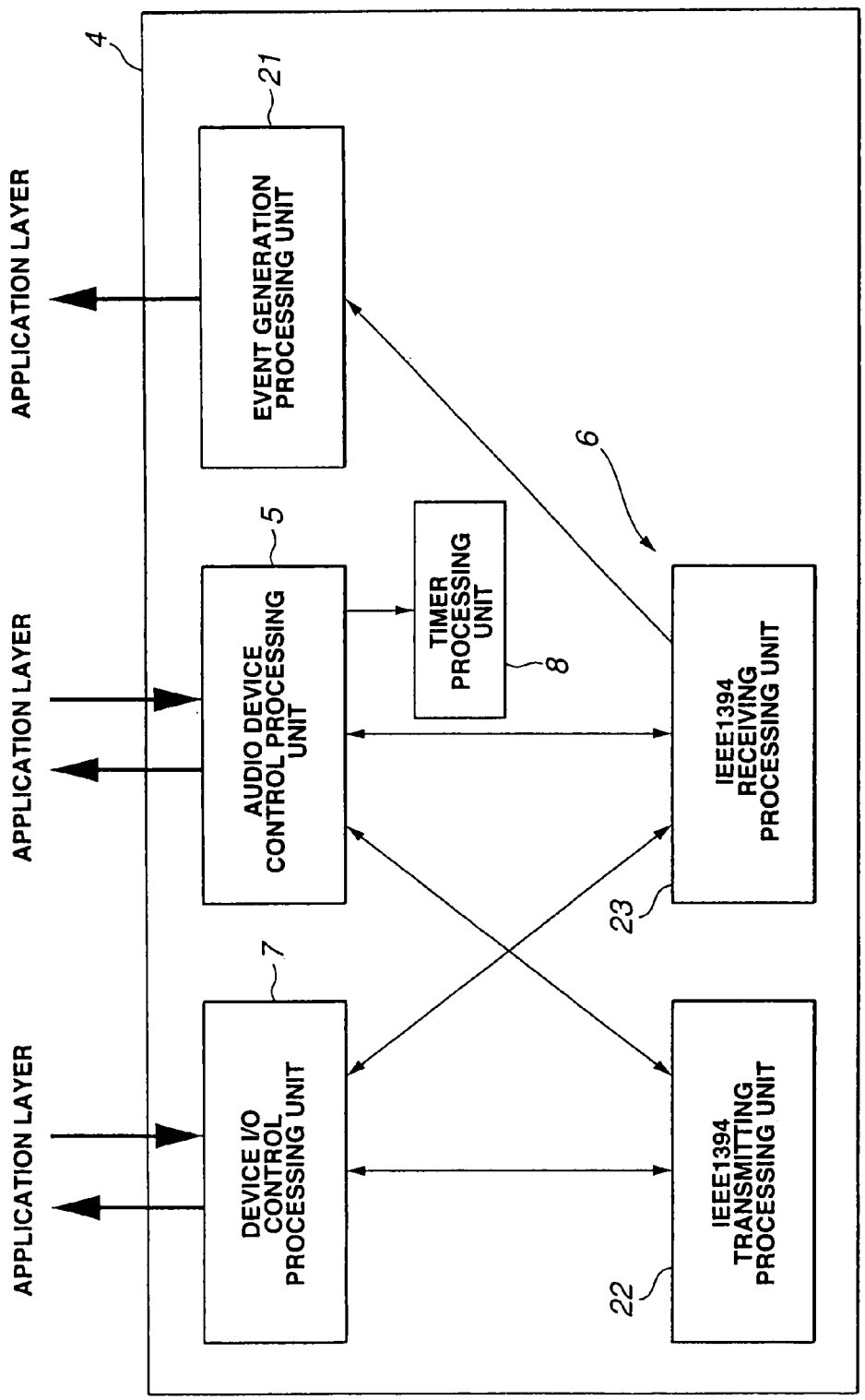
FIG. 2 is a block diagram showing the detail of device driver layer.

FIG. 2 is a block diagram showing the detail of the device driver layer 4. The device driver layer 4 includes, as shown in FIG. 2, an audio device control processing unit 5 for carrying out transmission/reception of audio device control C1 between the device driver layer 4 and the application layer 3, a device I/O control processing unit 7 for carrying out transmission/reception of device I/O control C2 between the device driver layer 4 and the application layer 3, a timer processing unit 8 for executing timer processing by designation from the audio device control processing unit 5, and an event generation processing unit 21 for carrying out event generation processing with respect to the application layer 3.

In addition, the IEEE 1394 interface unit 6 includes, as shown in FIG. 2, an IEEE 1394 transmitting processing unit 22, and an IEEE 1394 receiving processing unit 23. The IEEE 1394 transmitting processing unit 22 serves to carry out transmitting processing of signals from the device I/O control processing unit 7 and the audio device control processing unit 5. The IEEE 1394 receiving processing unit 23 serves to carry out receiving processing of signals to the device I/O control processing unit 7, the audio device control processing unit 5 and the event generation processing unit 21.

Figure 3:
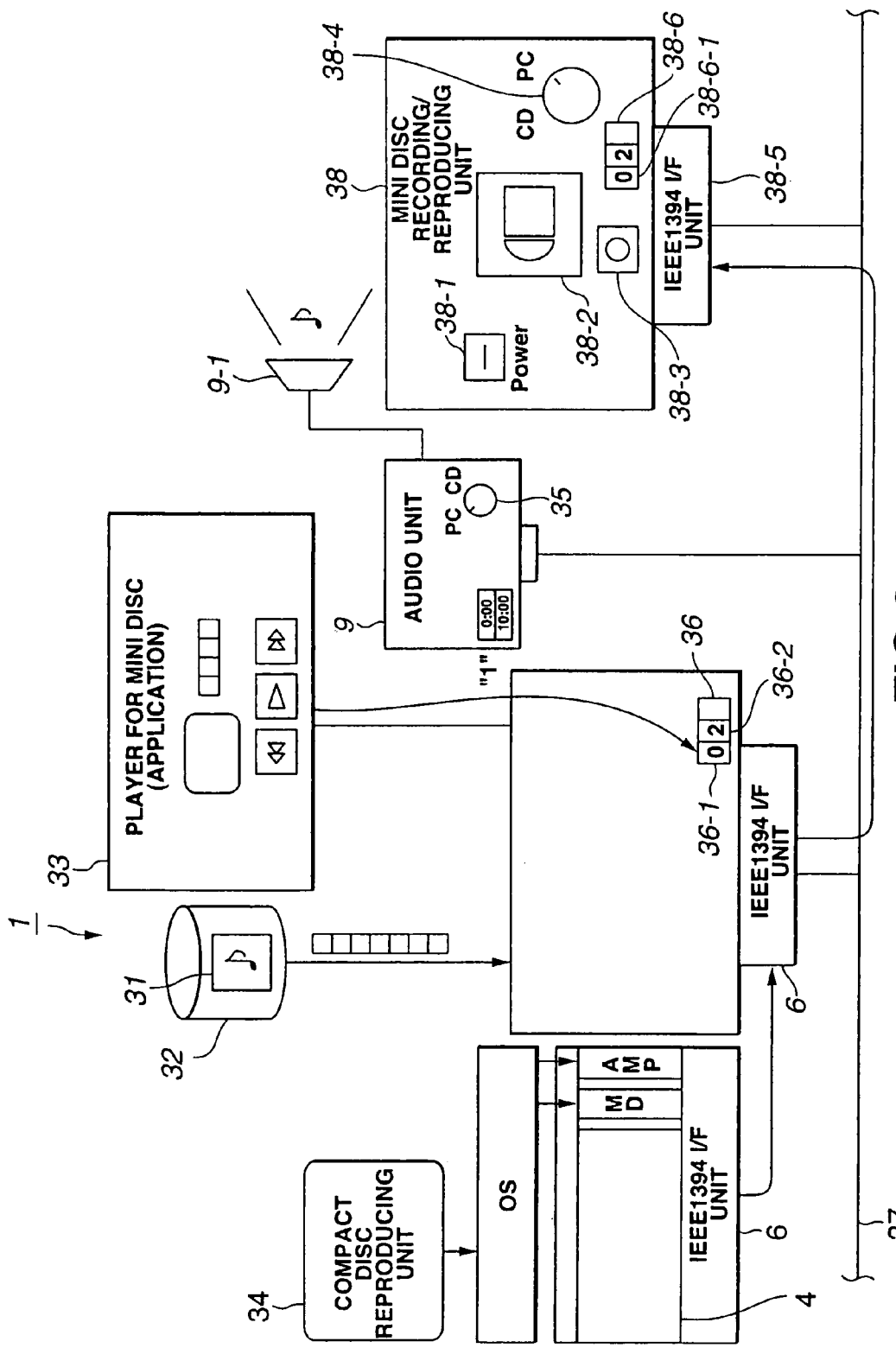
FIG. 3 is a view showing transfer of mute data or stream data.

FIG. 3 is a view showing transfer of mute data or stream data. This FIG. 3 shows the state where the personal computer 1 through the IEEE 1394 interface unit 6, a mini disc recording/reproducing unit 38 through an IEEE 1394 interface unit 38-5, and the audio unit 9 are connected to a network 37. As stated above, the personal computer 1 is caused to be recognized as virtual IEEE 1394 audio unit by driver software with respect to the audio unit 9 and the mini disc recording/reproducing unit 38.

Here, value of Point-to-point connection counter 36-2 (hereinafter referred to as P to P counter) indicating the number of connections of output Plug Control Register 36 (hereinafter referred to as oPCR) which will be described later of the personal computer 1 indicates "2". This indicates that the personal computer 1 can recognize that there exist two units connected to the IEEE 1394 network in addition to the personal computer 1.

Here, for example, it is assumed that power supply of the mini disc recording/reproducing unit 38 is placed in ON state by a power switch 38-1, and the personal computer 1 is selected as communication destination by a switch 38-4. In addition, value of an Online/Offline counter 36-1 of the oPCR 36 of the personal computer 1 indicating communication state with respect to the IEEE 1394 network is assumed to be "0" indicating Offline for the purpose of preventing that useless load is applied to the personal computer 1.

Thus, when, e.g., user carries out an operation to record audio data stored in a hard disc 32 of the personal computer 1 with respect to a mini-disc 38-2 of the mini-disc recording/reproducing unit 38, a player 33 for mini disc which is one of applications operative at the application layer 3 of the personal computer 1 outputs, to the IEEE 1394 interface unit 6, through the network 37, instruction to rewrite value of an Online/Offline counter 38-6-1 of an oPCR 38-6 that the mini-disc recording/reproducing unit 38 has into "1" indicating Online, e.g., input select command at the so-called AV/C command to allow the operating state of the mini disc recording/reproducing unit 38 to shift to data receivable state. In accordance with this, the mini disc recording/reproducing unit 38 rewrites value of the Online/Offline counter 36-1 of the oPCR 36 that the personal computer 1 has into "1" indicating Online. As a result, link between the personal computer 1 and the mini disc recording/reproducing unit 38 is established.

It is to be noted that while the above-described more practical example relates to the operation of the player 33 for mini disc after user allows power supply of the mini disc recording/reproducing unit 38 to be manually turned ON, there may be employed, e.g., an approach such that the player 33 for mini disc examines the state of the power supply of the mini disc recording/reproducing unit 38 by using AV/C command, whereby when power supply is not placed in ON state, power supply of the mini disc recording/reproducing unit 38 is turned ON by using power command in the AV/C command.

The player 33 for mini disc operative at the application layer 3 of the personal computer 1 sends REC pause command in the AV/C command to the mini disc recording/reproducing unit 38 through the network 37 to request the mini disc recording/reproducing unit 38 to start recording of audio data with respect to the mini disc 38-2. This produces effect similar to the effect that Rec button 38-3 for carrying out input operation of recording start designation is operated.

The operating state of the mini disc recording/reproducing unit 38 which has received the designation of recording start shifts to recording state. Thus, the mini disc recording/reproducing unit 38 rotates, e.g., the mini disc 38-2 to carry out mechanical operation to move the optical pick-up and the magnetic head to the recording position, etc. Thereafter, actual recording can be carried out. Further, since the mini disc recording/reproducing unit 38 requires time also for processing of response with respect to control from the personal computer 1, it is not brought into recording start state in a moment.

Thus, the player 33 for mini disc operative at the application layer 3 of the personal computer 1 transfers mute data corresponding to mute as audio data to the mini disc recording/reproducing unit 38 through the network 37. As a result, between the personal computer 1 and the mini disc recording/reproducing unit 38, link in the isochronous data transfer of the IEEE 1394 standard is established. Meanwhile, in the case where, e.g., in order so that user monitors music being recorded, power supply of the audio unit 9 is turned ON, and a switch 35 for selecting input source of the audio unit 9 is set at the personal computer 1, the player 33 for mini disc recognizes its setting to transmit audio data corresponding to mute also to the audio unit 9 through the network 37. Accordingly, sound of mute is outputted from a speaker 9-1 of the audio unit 9.

The mini disc recording/reproducing unit 38 is adapted so that when audio data to be recorded does not exist, it maintains input data in the mute state. In order to confirm as to whether or not the mini disc recording/reproducing unit 38 can record input data, the player 33 for mini disc operative at the application layer 3 of the personal computer 1 sends input select status command in the AV/C command to the mini disc recording/reproducing unit 38 through the network 37. Further, the player 33 for mini disc receives input select status response from the mini disc recording/reproducing unit 38 corresponding thereto the confirm as to whether or not the mini disc recording/reproducing unit 38 is placed in the state where input data can be recorded.

In the case where the player 33 for mini disc can judge that the mini-disc recording/reproducing unit 38 is placed in recordable state, it switches data being transmitted from mute data, e.g., to audio data of file 31 stored at the hard disc 32 of the personal computer 1 to transmit the audio data to the mini disc recording/reproducing unit 38. The mini disc recording/reproducing unit 38 releases mute state immediately when it receives audio data, and implements, e.g., a predetermined compression processing or modulation processing suitable for recording to this audio data thereafter to record it at the mini disc 38-2.

As described above, in the data transmission system to which the present invention is applied, in recording audio data from the personal computer 1 at the mini disc recording/reproducing unit 38, the personal computer 1 does not immediately output audio data, but sends mute data to the mini disc recording/reproducing unit 38 for a predetermined time until the mini disc recording/reproducing unit 38 can record audio data to send audio data to the mini disc recording/reproducing unit 38 after the mini disc recording/reproducing unit 38 has made arrangement for audio data recording. Namely, mute data are first successively sent to thereby maintain link between the personal computer 1 and the mini disc recording/reproducing unit 38 in the isochronous data transfer of the IEEE 1394 standard to have ability to shift the operating state of the mini disc recording/reproducing unit 38 to recordable state, and to have ability to carry out recording of audio data in which operating time of mechanical parts required for allowing the operating state of the mini disc recording/reproducing unit 38 to shift to recording state, and/or response relating to control from the personal computer 1 with respect to the mini disc recording/reproducing unit 38 are taken into consideration.

Figure 4:
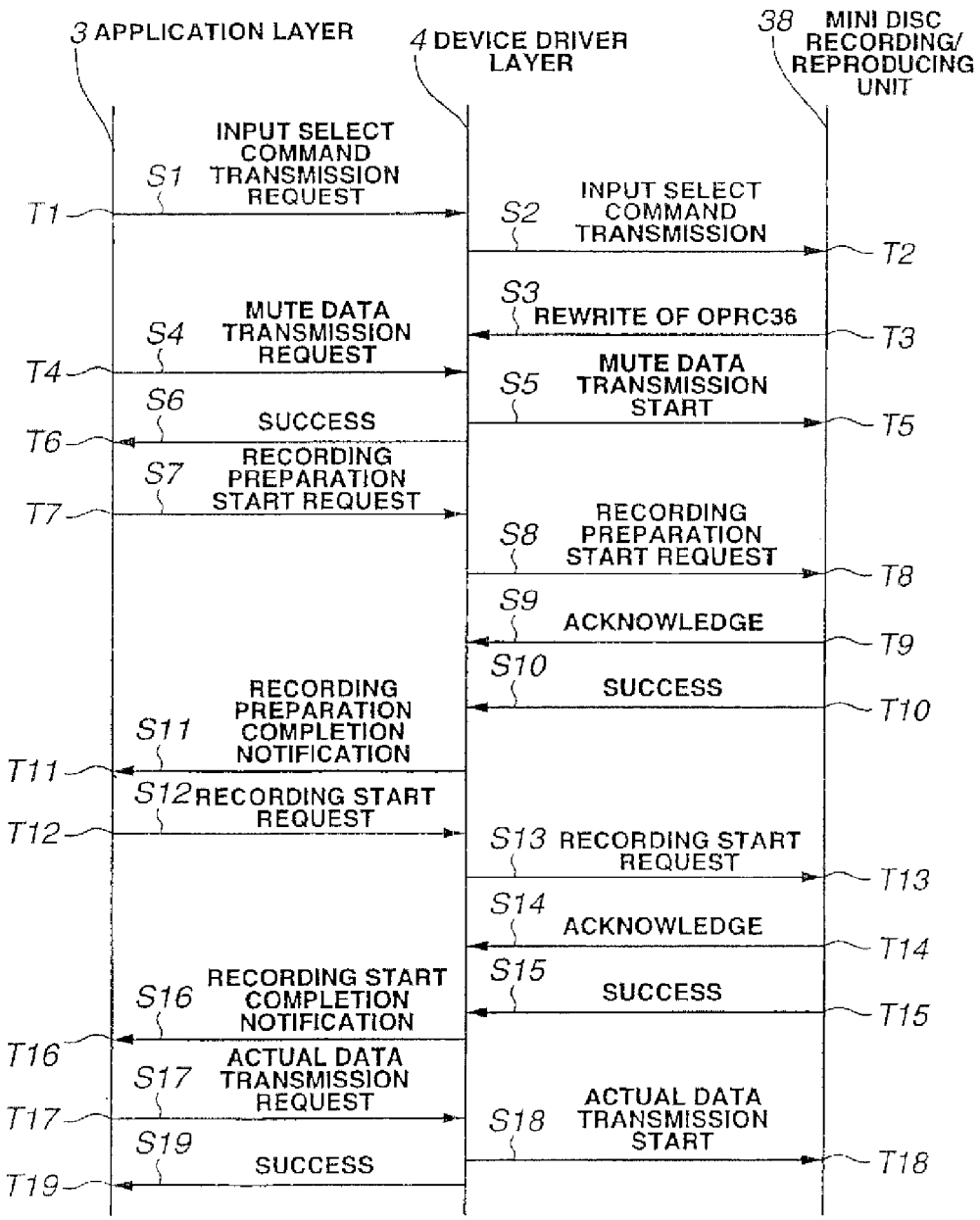
FIG. 4 is a view showing state transition from transfer preparation completion of application.

FIG. 4 is a time chart showing the operations of the application layer 3 and the device driver layer 4 included within the above-described personal computer 1, and the mini disc recording/reproducing unit 38.

When, e.g., in order to record audio data stored at the hard disc 32 of the personal computer 1 onto the mini disc 38-2 of the mini disc recording/reproducing unit 38 as shown in FIG. 4, user carries out a predetermined operation to select icon which reads out audio data of, e.g., the hard disc 32 of graphic user interface displayed on display screen of the personal computer 1, a request signal S1 which transmits input select command in the A/V command to the mini disc recording/reproducing unit 38 is delivered from the application layer 3 to the device driver layer 4 of the personal computer 1 at time T1 with that operation being as trigger.

In accordance with this, at time T2, the device driver layer 4 sends out input select command in the AV/C command to the mini disc recording/reproducing unit 38. At time T3, the mini disc recording/reproducing unit 38 delivers, to the device driver layer 4, a signal S3 for rewriting value of Online/Offline counter 36-1 of the oPCR 36 into "1" in order to shift the operating state of the personal computer 1 to the Online state, i.e., the state where transmission/reception of data can be made. As a result, between the personal computer 1 and the mini disc recording/reproducing unit 38, link, i.e., channel in the isochronous data transfer of the IEEE 1394 standard is established.

At time T4, a mute data transmission request signal S4 is delivered from the application layer 3 to the device driver layer 4 of the personal computer 1. At time T5, a mute data transmission start signal S5 is delivered from the device driver layer 4 to the mini disc recording/reproducing unit 38.

At time T6, a success signal S6 is delivered from the device driver layer 4 to the application layer 3. At time T7, a recording preparation start request signal S7 is delivered from the application layer 3 to the device driver layer 4. At time T8, a recording preparation start request signal S8 is delivered from the device driver layer 4 to the mini disc recording/reproducing unit 38.

At time T9, an acknowledge signal S9 is delivered from the mini disc recording/reproducing unit 38 to the device driver layer 4. At time T10, a success signal S10 is delivered from the mini disc recording/reproducing unit 38 to the device driver layer 4.

At time T11, a recording preparation completion notification signal S11 is delivered from the device driver layer 4 to the application layer 3. At time T12, a recording start request signal S12 is delivered from the application layer 3 to the device driver layer 4. At time T13, a recording start request signal S13 is delivered from the device driver layer 4 to the mini disc recording/reproducing unit 38.

At time T14, an acknowledge signal S14 is delivered from the mini disc recording/reproducing unit 38 to the device driver layer 4. At time T15, a success signal S15 is delivered from the mini disc recording/reproducing unit 38 to the device driver layer 4.

At time T16, a recording start completion notification signal S16 is delivered from the device driver layer 4 to the application layer 3. At time T17, an actual data (streaming data) transmission request signal S17 is delivered from the application layer 3 to the device driver layer 4. At time T18, an actual data (streaming data) transmission start signal S18 is delivered from the device driver layer 4 to the mini disc recording/reproducing unit 38. At time T19, a success signal S19 is delivered from the device driver layer 4 to the application layer 3.

It is to be noted that while audio data stored at the hard disc 32 of the personal computer 1 is recorded at the mini disc 38-2 of the mini disc recording/reproducing unit 38 in the above-described more practical example, the present invention is not limited to this more practical example, but there may be employed, e.g., an approach to record, at the mini disc 38-2, audio data which have been read out at compact disc reproducing unit that the personal computer 1 has, and external compact disc reproducing unit 34.

Moreover, while transmission time of mute data is caused to be time period from time T5 to time T15 in the above-described more practical example, this mute data transmission time is determined by processing ability of the personal computer 1 and/or preparation time until the mini disc recording/reproducing unit 38 is placed in recordable state, etc., and there may be employed any time in which link between the personal computer 1 and the mini disc recording/reproducing unit 38 is maintained and required until the operating state of the mini disc recording/reproducing unit 38 shifts to recordable state. In other words, mute data transmission time can be also experimentally or empirically determined in advance, and, e.g., may be set to 1 sec. irrespective of the above-described time chart.

Figure 5:
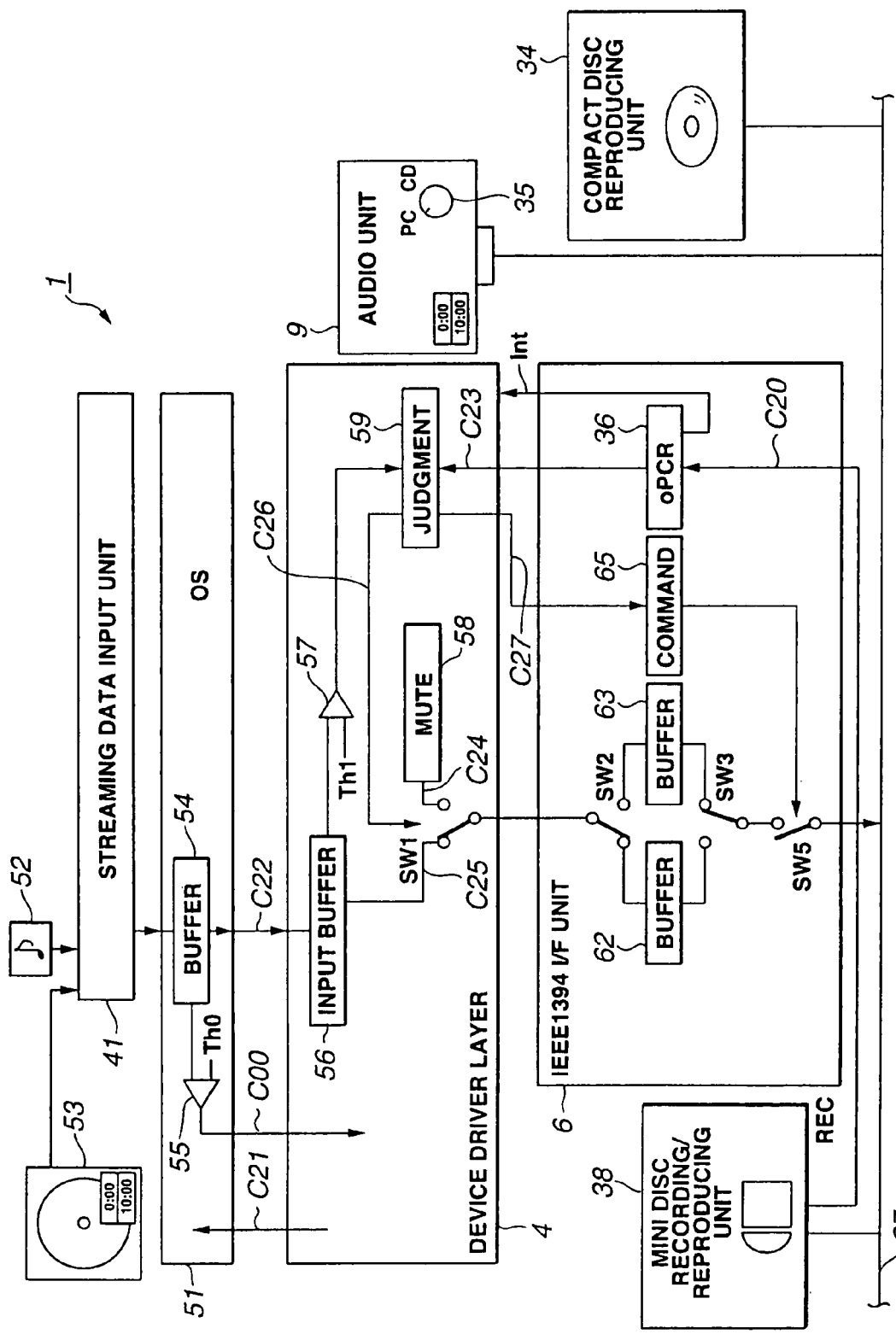
FIG. 5 is a view showing control of transfer of mute data or stream data.

Here, explanation will be given in connection with more practical processing executed within the personal computer 1. FIG. 5 is a view showing processing of transfer of mute data or stream data. This FIG. 5 shows the state where the personal computer 1, the audio unit 9 and the mini disc recording/reproducing unit 38 are connected through the IEEE 1394 interface unit 6.

The personal computer 1 includes, as shown in FIG. 5, a streaming data input unit 41, an operating system (hereinafter referred to as OS), device driver layer 4, and IEEE 1394 interface unit 6.

Further, the OS 51 includes, as shown in FIG. 5, a buffer 54 for storing streaming data 52, and a comparator 55 for comparing threshold value Th0 and data storage quantity of the buffer 54. The device driver layer 4 includes, as shown in FIG. 5, an input buffer 56 for storing data, a comparator 57 for comparing threshold value Th1 and data storage quantity of the input buffer 56, a mute data generating unit 58, a changeover switch SW1 for carrying out switching between mute data and transfer data, and a judgment unit 59 for judging switching between mute data and transfer data. The IEEE 1394 interface unit 6 includes, as shown in FIG. 5, changeover switches SW2, SW3 for switching transfer data, buffers 62, 63 for storing transfer data, an oPCR (output Plug Control Register) 64 indicating output plug, a command generating unit 65 for generating transfer command, and a switch SW5 for controlling transfer timing.

Explanation will be given in connection with the operation of data transfer control at the OS 51, the device driver layer 4 and the IEEE 1394 interface unit 6 which have been constituted in this way.

When, e.g., user carries out a predetermined operation to record, at the mini disc recording/reproducing unit 38, audio data stored at the hard disc 32 of the personal computer 1, or audio data from audio compact disc loaded at a compact disc reproducing unit 53 that the personal computer 1 has, a signal C20 for rewriting value into the oPCR 36 of the IEEE 1394 interface unit 6 is delivered through the network 37 from the mini disc recording/reproducing unit 38 in order to establish link between the personal computer 1 and the mini disc recording/reproducing unit 38 as described above. Thus, value of Online/Offline counter 36-1 of the oPCR 36 is rewritten from "0" to "1". This rewrite signal C20 also serves as interruption request signal Int with respect to the device driver layer 4.

By this interruption request signal Int, the judgment unit 59 of the device driver layer 4 reads thereinto, as register value C23, value of Online/Offline counter 36-1 of the oPCR 36. When register value C23 changes to "1", the judgment unit 59 carries out control so that the changeover switch SW1 selects mute data which is output C24 of the mute data generating unit 58 by switching instruction C26. Simultaneously therewith, the judgment unit 59 generates transfer signal C27 to deliver it to the command generating unit 65. When the transfer signal C27 is delivered, the command generating unit 65 generates command which realizes isochronous data transfer, i.e., command which places switch SW5 in ON state by length corresponding to established isochronous channel to intermittently place the switch SW5 in ON state.

As a result, immediately after value of the Online/Offline counter 36-1 of the oPCR 36 of the personal computer 1 and value of Online/Offline counter 38-6-1 of oPCR 38-6 of the mini disc recording/reproducing unit 38 changes from "0" to "1" so that channel of isochronous data transfer, i.e., link between the personal computer 1 and the mini disc recording/reproducing unit is established, mute data generated at the mute data generating unit 58 is sent out to the network 37 through changeover switches SW1 and SW2, buffer 62 or 63, changeover switch SW3 and switch SW5, and is sent to the mini disc recording/reproducing unit 38. In this example, the changeover switches SW2, SW3 and the buffers 62, 63 are components for isochronously transferring mute data from the mute data generating unit 58, or audio data from hard disc 32 which will be described later to the mini disc recording/reproducing unit 38 through isochronous channel established at the network 37 in conformity with the IEEE 1394 standard. Namely, in the isochronous transfer, since data is transferred at a fixed interval set by the so-called cycle synchronization, e.g., interval of 8 kHz, there is employed an approach such that mute data successively generated from the mute data generating unit 58 are alternately written (are caused to undergo buffering) into the buffer 62 and the buffer 63 to read out mute data from buffer in which write operation is not carried out at present, and to close the switch SW5 by length corresponding to established isochronous channel to send out such mute data to the network 37. Transmission (sending) operation of mute data by such processing is continued for a predetermined time as described above. Thereafter, audio data is sent out.

In more practical sense, the device driver layer 4 delivers a data request signal C21 to the OS51 by the above-described interruption request signal Int in parallel to the above-described processing. On the other hand, audio data from the hard disc 32, or audio data from audio compact disc loaded at the compact disc reproducing unit 53 that the personal computer 1 has is inputted to the streaming data input unit 41 as streaming data 52. The data which has been inputted to the streaming data input unit 41 is delivered to the buffer 54 of the OS51, and is temporarily stored therein. When data request signal C21 is delivered, the OS51 starts supply to the device driver layer 4 of audio data stored in the buffer 54. At this time, the comparator 55 compares threshold value Th0 and data storage quantity of the buffer 54, whereby when data storage quantity of the buffer 54 is above the threshold value Th0, it delivers start signal C00 to the device driver layer 4. On the other hand, the comparator 55 compares the threshold value Th0 and data storage quantity of the buffer 54, whereby when data storage quantity of the buffer 54 is not above the threshold value Th0, it delivers stop signal C00 to the device driver layer 4.

Audio data is delivered as variable block length data from the buffer 54 of the O551 to the input buffer 56 of the device driver layer 4, and the input buffer 56 temporarily stores this audio data. This variable block length data is, e.g., data of 16 bits and 44.1 KHz sample/2ch, and has not time information.

The comparator 57 of the device driver layer 4 compares threshold value Th1 and data storage quantity of the input buffer 56, whereby when data storage quantity of the input buffer 56 is above the threshold value Th1, it outputs detection signal to the judgment unit 59 of the device driver layer 4. The judgment unit 59 is operative so that when the detection signal is delivered, it carries out control by switching instruction C26 so that changeover switch SW1 selects audio data which is output C25 of the input buffer 56. Moreover, the judgment unit 59 and the command generating 20 unit 65 intermittently place switch SW5 in ON state in synchronism with isochronous channel established between the personal computer 1 and the mini disc recording/reproducing unit 38, similarly to the above-described sending operation (transmission) of mute data by transfer signal C27. As a result, after mute data is continuously sent out from the personal computer 1 for a predetermined time, sending operation (transmission) of audio data is started. Thus, audio data is transferred to the mini-disc recording/reproducing unit 38.

Meanwhile, in order to execute the above-described operation, there are required application layer 3 which can operate the mini disc recording/reproducing unit 38 serving as IEEE 1394 audio recording unit by the personal computer 1, and device driver layer 4 for issuing instruction with respect to the mini disc recording/reproducing unit 38 serving as IEEE 1394 audio recording unit, or for coping with instruction which makes a request for data transfer from the mini disc recording/reproducing unit 38 serving as IEEE 1394 audio recording unit. Further, while the application layer 3 and the device driver layer 4 have been explained in a manner of hardware in the above-described explanation, it a matter of course to realize the application layer 3 and the device driver layer 4 by software.

As is clear also in the above explanation, in the data transmission system to which the present invention is applied, first in order to start recording of audio data with respect to the mini disc recording/reproducing unit 38 serving as IEEE 1394 audio recording unit, preparation for transferring audio data desired to be recorded with, respect to the mini disc recording/reproducing unit 38 serving as IEEE 1394 audio recording unit is carried out by the application layer 3. At the time when preparation has been completed, the device driver layer 4 is requested so as to transfer mute data. After the device driver layer 4 notifies the application layer 3 that transfer of silent data has been started, the application layer 3 makes a request through the network 37 to the device driver layer 4 so as to allow the mini disc recording/reproducing unit serving as IEEE 1394 audio recording unit to carry out recording preparation.

Further, when the notification that arrangement of recording preparation is made comes from the mini disc recording reproducing unit 38 serving as IEEE 1394 audio recording unit, the application layer 3 notifies the device driver layer 4 that arrangement of preparation for transmitting audio data desired to be recorded is made, and the application layer 3 requests the device driver layer 4 so as to transmit recording start and data desired to be recorded to the mini disc recording/reproducing unit 38 serving as IEEE 1394 audio recording unit.

Thus, since recordable mute data is flowing when the mini disc recording/reproducing unit 38 serving as IEEE 1394 audio recording unit is placed in the recording preparation state, it is possible to carry out recording preparation without taking into consideration the fact that link is cut off. In addition, since actual data (streaming data) to be recorded is transferred after recording start, it is possible to transfer actual data (streaming data) in the state where break of the leading portion does not take place.

Figure 6:
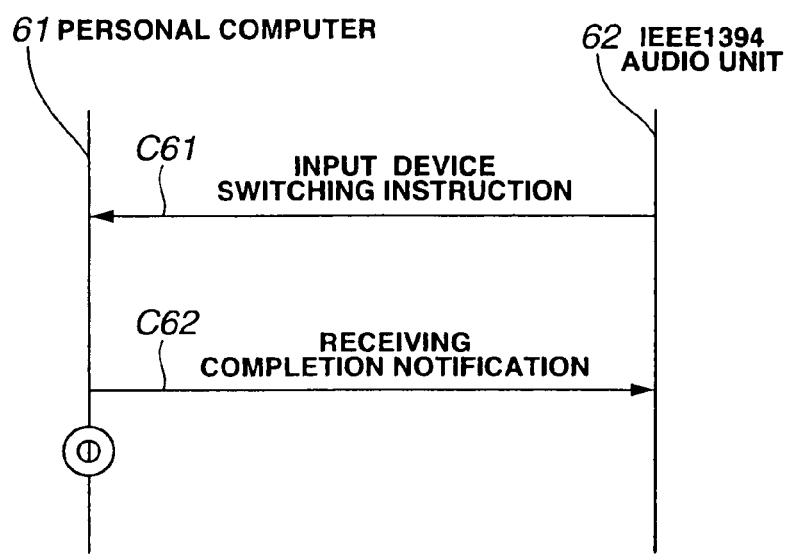
FIG. 6 is a view showing input device switching, transfer permission and Online/Offline.

FIG. 6 is a view showing input device switching, transfer permission and flow of Online/Offline. As shown in FIG. 6, input device switching instruction C61 is delivered from an IEEE 1394 audio unit 62 to a personal computer 61, and receiving completion notification C62 is delivered from the personal computer 61 to the IEEE 1394 audio unit 62. In the case where the personal computer 61 does not notify the IEEE 1394 audio unit 62 that the personal computer 61 is in ON line state after this receiving completion notification C62, the personal computer 61 is required to continue to transmit audio data or any data to the IEEE 1394 audio unit 62.

For this reason, in the case where transfer is permitted by the time indicated at .circleincircle., audio data is transferred from the personal computer 61 to the IEEE 1394 audio unit 62. In the case where transfer is not permitted, e.g., register of oPCR 36 (Online/Offline counter 36-1) of FIG. 5 indicating Online or Offline of the personal computer 61 itself is changed into Offline.

Plug Control Register (hereinafter referred to as PCR) is a register in which concept of plug is substantialized, and is caused to undergo mapping with respect to address space of Channel Status Register (hereinafter referred to as CSR) architecture conformity (ISO/IEC-13213) of the IEEE 1394. One PCR exists with respect to one Plug. As the PCR, there are output Plug Control Register (hereinafter referred to as oPCR) indicating output plug, input Plug Control Register (hereinafter referred to as iPCR) indicating input plug, and output Master Plug Register (hereinafter referred to as oMPR) and input Master Plug Register (hereinafter referred to as iMPR) indicating information of output plug and input plug peculiar to equipment.

With respect to the oPCR and the iPCR, the equipment can respectively have 10 registers at the minimum to 31 registers at the maximum in accordance with the number of plugs of the equipment. In the case where equipment has oPCR, the equipment is required to have one oMPR. In the case where equipment has iPCR, the equipment is required to have one iMPR. Various PCRs respectively consist of 32 bit registers, wherein their inside is divided into fine fields.

FIG. 7 is a view indicating oPCR (ffff f000 0904h.about-.ffff F000 097Ch) representing Online state, Offline state, transfer enable state and transfer disable state.

In FIG. 7, Online 71 is a register that power supply declares ON or OFF with respect to IEEE 1394 audio unit, wherein "0" indicates OFF and "1" indicates ON. The Online 71 is adapted to have ability to carry out rewrite operation only with respect to the device driver. Register of Online means that even if connection indicating connection of signal path is formed or established, there is the state where isochronous data transfer cannot be carried out. Even in either state, it is possible to form or establish connection. A component which actually carries out input or output of isochronous data is plug in active state of Online and where connection is formed or established.

Broadcast connection counter 72 is a counter indicating whether or not connection for broadcast transfer exists, wherein "0" indicates absence of connection and "1" indicates presence of connection. The Broadcast connection counter 72 can carry out rewrite operation from both the device driver and the IEEE 1394 audio recording unit side. In the Broadcast connection, connection between output plug and isochronous channel, or connection between input plug and isochronous channel is carried out without designating pair of output plug and input plug.

Point-to-point connection counter 73 is a register for judging whether or not the IEEE 1394 audio recording unit is in transmission permission state, wherein "0.about.3f" indicates the number of point-to-point connections. When this value is 1 or more, the IEEE 1394 audio recording unit outputs transfer permission of data. The point-to-point connection counter 73 can carry out rewrite operation from the IEEE 1394 audio recording unit side. The point-to-point connection is connected to input plug via one isochronous channel from output plug to form signal path.

Reserved 74 is reserved counter. The reserved 74 can carry out rewrite operation from both the device driver and the IEEE 1394 audio recording unit side.

Channel number 75 is a counter indicating channel number used. "0.about.3f" indicate channel numbers used for isochronous transfer.

Data rate 76 is a counter indicating transfer rate used for isochronous transfer, wherein "00h" is S100, "01h" is S200 and "02h" is S400.

Overhead ID 77 is a register which designates communication overhead.

Payload 78 is a counter indicating data size, wherein "0.about.3ff" indicate quadled size indicated by the number of bytes=payload.times.4.

FIG. 8 is a view showing overhead ID. In FIG. 8, when overhead ID 81 is 000h, IEEE 1394 band wide allocation unit 82 is 512; when overhead ID 81 is 0001h, IEEE 1394 band wide allocation unit 82 is 32; when overhead ID 81 is 0010h, IEEE 1394 band wide allocation unit is 64; when overhead ID 81 is 0011h, IEEE 1394 band wide allocation unit 82 is 96; when overhead ID 81 is 0100h, IEEE 1394 band wide allocation unit 82 is 128; when overhead ID 81 is 0101h, IEEE 1394 band wide allocation unit 82 is 160; when overhead ID 81 is 0110h, IEEE 1394 band wide allocation unit 82 is 192; and when overhead ID 81 is 0111h, IEEE 1394 band wide allocation unit 82 is 224.

Moreover, in FIG. 8, when overhead ID 83 is 1000h, IEEE 1394 band wide allocation unit 84 is 256; when overhead ID 83 is 1001h, IEEE 1394 band wide allocation unit 84 is 288; when overhead ID 83 is 1010h, IEEE 1394 band wide allocation unit 84 is 320; when overhead ID 83 is 1011h, IEEE 1394 band wide allocation unit 84 is 352; when overhead ID 83 is 1100h, IEEE 1394 band wide allocation unit 84 is 384; when overhead ID 83 is 1101h, IEEE 1394 band wide allocation unit is 416; when overhead ID 83 is 1110h, IEEE 1394 band wide allocation unit 84 is 448; and when overhead ID 83 is 111h, IEEE 1394 band wide allocation unit 84 is 480.

Change of PCR is shown below. PCR of corresponding equipment itself and PCR of an equipment connected via IEEE 1394 interface both carry out change of value by lock transaction of compare and swap. Change of value of PCR is carried out in accordance with the following condition.

For a time period during which oPCR is adapted so that connection is formed or established, channel and band which serve as isochronous resource of 1394 must be secured.

Moreover, changes of channel number 75 and data rate 76 of oPCR are inhibited when connection is formed or established.

Further, broadcast connection can be formed or established only with respect to the equipment which has corresponding plug.

Further, when connection is formed or established with respect to output plug, data rate 76, overhead ID 77, channel number 75 of oPCR, broadcast connection counter 72, and point-to-point connection counter 73 carry out change of values by lock transaction of the same compare and swap.

Then, mechanism of the lock transaction will be explained. The lock transaction utilizes three kinds of values of arg_value, data_value and old_value as write parameter, and uses a writing method called compare and swap in rewrite operation of oPCR. Write sequence is as follows.

First, requester (audio unit) prepares request packet in which current value of register to be written is designated as arg_value and value desired to be written is designated as data_value to transmit it to responder (personal computer).

Secondly, the responder (personal computer) compares arg_value of received request packet and current value of register, whereby when the both values are equal to each other, value of register is changed into data_value, while when they are not equal to each other, that value is not changed. Thereafter, response packet in which value of register at the time point when the request packet is received is caused to be old_value is prepared to transmit it to the requester (audio unit).

Thirdly, the requester (audio unit) compares old_value of received response packet and arg_value that the requester has transmitted, whereby when both values are equal to each other, it is judged that write operation has been succeeded, while when they are not equal to each other, it is judged that write operation fails.

FIG. 10 is a view showing packet example (Isochronous Transaction) in which mute data has been outputted to the IEEE 1394 MD device. FIG. 10A shows packet and FIG. 10B shows packet content.

First, explanation will be given in connection with isochronous header of FIG. 10B. Length indicates data length, and the data length consists of CIP header portion and IEC 958 audio data portion. The CIP header indicates the portion put between Header CRC and (Data (Sample1)) is put, and the IEC 958 audio data indicates the portion from data (Data (Sample1)) to data (Data (Sample5)).

Tag (isochronous data format tag) indicates Isochronous packet format. Channel indicates channel used for identification of packet. tCode (Transaction code) is code (isochronous is Ah) indicating classification of packet. sy (synchronization code) is used for carrying out exchange of synchronous information such as image or sound, etc. between transmitting node and receiving node.

In CIP header, SID is node ID which is transmitting packet. DBS is divided one data block size. FN is the number of divisions with respect to data block size of one source packet. QPO is quadled number added for carrying out division. SPH is an area indicating whether or not source packet header is added (=1). DBC is continuous counter of data block, and is used for detecting missing of packet, etc. FMT is an area indicating what format packet has. FDF is an area indicating Basic Format for AM824. SYT is field where time information used for synchronization is inserted for the purpose of carrying out synchronization of data between transmitting side and receiving side, wherein cycle counter is caused to be reference as unit of time.

FIG. 9 is a view showing an example of instruction which changes input source. FIG. 9 shows the detail of data portion of instruction which changes input source sent from the personal computer to the audio unit.

In FIG. 9, there are provided ZERO 91 and Preamble 92. Parity 93 provided thereafter indicates 0 when value obtained by adding bits from the fifth bit to the 32-th bit is even number, and indicates 1 when that value is odd number.

Channel 94 is data represented by 192 samples, and indicates packet characteristic of 1 bit.times.192 Packet=24 byte. User 95 indicates 1 when data channel is prepared within the same subframe, and indicates 0 when such data channel is not prepared.

Validate 96 indicates 0 at the time of data Aux valid state (24 bit data field), and indicates 1 at the time of data Aux invalid state (20 bit data field).

It should be noted that while the above-described data transfer has been explained by taking the communication system in conformity with the IEEE 1394 standard as an example, the present invention is not limited to such an implementation, but may employ other communication system.

INDUSTRIAL APPLICABILITY

In the present invention, in transmitting stream data successively reproduced at a point of time to the recording unit connected through the network, mute data generated from a mute data generating means is transmitted to the recording unit through the network for a time period during which the data holding means holds the streaming content data for a first predetermined time value. On the other hand, in the case where it is detected that data that the data holding means holds is held for a second predetermined time value, the stream data is transmitted to the recording unit through the network. Thus, the recording unit is permitted to carry out recording operation in the state where sound is not interrupted, and is permitted to execute data recording in which operating time of mechanical parts required for allowing the operating state of the recording unit to shift to the recording state, and/or response relating to control with respect to the recording unit are taken unto consideration.

The invention claimed is:

1. A method of isochronously transmitting audio data for recording, the method comprising:

establishing an isochronous link over a network between a personal computer and a recording unit;

transmitting mute data having a same signal form as a signal form of the audio data but having data other than audio data, from the personal computer to the recording unit, to maintain the isochronous link between the personal computer and the recording unit for a time period that allows the personal computer to cause the recording unit to enter a recording state;

while transmitting the mute data,
    transmitting a recording preparation signal from the personal computer to the recording unit,
    receiving a preparation acknowledgment from the recording unit in response to the recording preparation signal,
    transmitting a recording start signal from the personal computer to the recording unit, and
    receiving a start acknowledgment from the recording unit in response to the recording start signal; and transmitting the audio data from the personal computer to the recording unit;

whereby the method provides a synchronous transition between transmission of the mute data and the audio data.

2. The method according to claim 1, further comprising a step of recording the audio data received by the recording unit.

3. The method according to claim 1, wherein the network conforms to an IEEE 1394 standard.

4. The method according to claim 1, further comprising a step of receiving a preparation success signal after the preparation acknowledgment from the recording unit in response to the recording preparation signal.

5. The method according to claim 1, further comprising a step of receiving a start success signal after the start acknowledgment from the recording unit in response to the recording start signal.

\* \* \* \* \*